Jan. 10, 1950
W. J. MILLER
2,494,101
APPARATUS FOR CONDITIONING AND SUPPLYING
CLAY TO POTTERY FORMING MACHINERY
Original Filed June 8, 1944
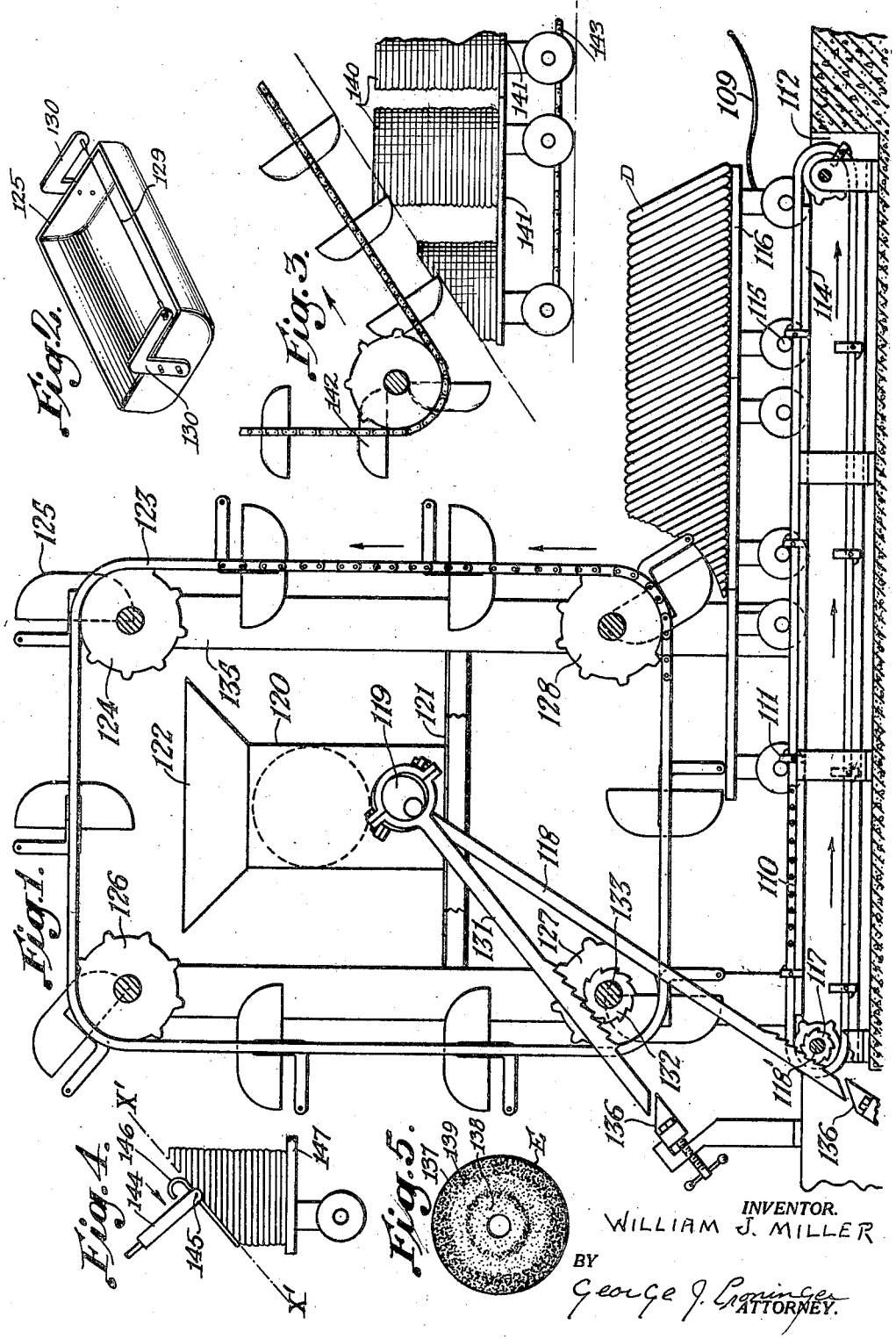
INVENTOR.
WILLIAM J. MILLER
BY
George J. Croninger
ATTORNEY.

Patented Jan. 10, 1950

2,494,101

UNITED STATES PATENT OFFICE 2,494,101

APPARATUS FOR CONDITIONING AND SUPPLYING CLAY TO POTTERY FORMING MACHINERY

William J. Miller, Pittsburgh, Pa., assignor to Miller Pottery Engineering Company, Swissvale, Pa., a corporation of Pennsylvania Original application June 8, 1944, Serial No. 539,258. Divided and this application September 12, 1945, Serial No. 615,846

6 Claims. (Cl. 25—22)

This application is a division of my co-pending application, Serial No. 539,258, filed June 8, 1944.

This invention relates to apparatus for conditioning and supplying clay to pottery ware forming machinery. It has to do particularly with a new system of handling clay between a source of supply, for instance a filter press and the ultimate point of use, for example the clay feeding stations of an automatic jiggering machine to thereby reduce labor hours and expense and to provide the jiggering machine with finer and more uniform texture clay and to reduce ware defects and rejects caused by lumps in the clay, thereby reducing the cost of the ware, and lastly to coordinate the supply of clay to the pug mill with that required by the jiggering machine.

All filter cakes have excess hard brims, excess soft center zones with the intermediate annular region having correct consistency for jiggering. Also all filter cakes are harder in that zone which is made at the top of the filter press and less hard at the zone which is made at the bottom of the filter press because the extruded water runs over the region at the bottom from above during pressing. Adjacent cakes of a pressing differ in average hardness due to the age of the filter bags, the cleanliness thereof or texture of weave. This is inherent and cannot be avoided. Also, the reserve stacks air dry at the periphery while awaiting use.

Heretofore, filter cakes have been removed from the filter press and stacked in twin, vertical columns on hand drawn trucks placed alongside the press, and then manually trucked to the pug mill and there manually wire cut into quarters and chunks as large as can be conveniently handled containing about 800 cu. in., and thrown into the pug mill by hand. There was no definite minute subdivision of the hard and soft zones of these large lumps prior to deposit in the pug nor subsequently within the pug to enable the pug knives to definitely blend said small subdivisions to thereby properly blend, homogenize, and plasticize the clay prior to discharge thereof from the pug barrel. The prior procedure involved three handlings of the material, one by the filter press operator, one by the truck puller and the third by the pug operator. The feed into the pug was spasmodic and there was no controllable predetermined volume delivery of clay into the pug mill to coordinate with the requirements of the jiggering machine. When the supply of clay falls below the demands, clay of a different texture and workability is supplied, production is necessarily curtailed with consequent increase in the cost of manufacture because of defective ware and idle machine crews. Large chunks of clay placed in the pug mill could not be mascerated into the very fine aggregates required for subdividing by the pug into the fine textured clay required for optimum jiggering and production of lump free ware. A lump, hard or soft, less than 1/8" or slurry seam, will result in scrapping of the piece of ware. If the cakes were too hard generally to produce pugged clay of optimum softness the adding of water in the pug was not practicable because the mass remains only a fraction of a minute in the pug which is not sufficient time to disintegrate large lumps and thereafter raise the water content uniformly through the mass, and the water will mix first with the soft clay. Should the pug mill become glutted from an oversupply of clay, then the texture and workability of the clay supplied is not the same as when the pug supply is inadequate. A uniform supply of clay, continuously delivered, that is to say not spasmodic or with long intervals in between, insures clay of uniform texture plasticity and workability, providing it is not lumpy to start with.

In the present invention, I place the truck directly under the press and drop the filter cakes in uniform progressive order directly on a truck as they are released from the filter press, and arrange the cakes in horizontally stacked relation with that portion of the filter cakes which is formed at the top of the press and is the driest portion of the cake, uppermost, and I do this by pulling the top of each cake outwardly in the press and permitting it to fall inclined into the desired arrangement. Truck loads of cakes are taken directly to a zone where they are added to the trailing end of a procession of filter cakes which is being transported in endwise fashion to a cutting off point. The hard and soft zones of successive cakes in the procession are arranged in overlapping relation relative to the cutting plane. Preferably, the procession first travels for a substantial period of time through a treating zone wherein surface moisture is added only to the harder brim zones and onto the top brim portion by additionally spraying mist moisture, the atmosphere in the treating zone being highly humid and preferably hotter than the cakes to facilitate moisture deposit thereon through sweating, all subject to regulations to establish and maintain, prior to subdivision, optimum water proportion of the mass as batches of cakes in the procession progress. The procession is then subdivided and thereafter intermingled and deposited in the pug. At the cutting off position, preferably relatively thin slices or wafers of clay are segregated from the procession by passing a cutting implement through a plurality of overlapping cakes, the cut preferably starting at the perimeter of the procession, said slice preferably folding or curling as it is detached, to further intermingle the hard brim portion with the softer portions of the slice. By slicing the material thin, large lumps in the pug supply are eliminated and the slice can be more completely and efficiently further subdivided and plasticized by the pug mill knives into the minute fine aggregates necessary for optimum fine texture jiggering clay and lump-free ware. The slices are cut off periodically and deposited directly or indirectly in the pug mill. The volume delivery of clay into the pug is coordinated with the jiggering machine's requirements through automatic or manual control over the rate of feed of the procession of filter cakes to the cutting off point, and the thickness of the slice is controlled by varying the periodicity of the stroke of the cutting implement and the shape of the curl by the rapidity of the stroke while cutting.

I thus substantially reduce pottery ware production cost by eliminating the pug feeding individual, reducing ware rejects chargeable to lumpy and off-consistency clay and insuring continuous production.

In the drawings:

Figure 1 is an elevation illustrating an apparatus for segregating and transporting clay from a parent column of clay to a pug mill.

Figure 2 is a detail in perspective of one of the clay carriers forming a part of the conveyor of Figure 1.

Figure 3 is an elevation illustrating a modified arrangement of the apparatus shown in Figure 1.

Figure 4 is a detail illustrating how the invention may be practiced with a manually operated cutter.

Figure 5 is a detail of a filter cake.

Where, due to space limitations or other factors, it is more desirable to move the procession D in a horizontal plane to a cutting off position, I provide a single chain conveyor 110, see Figure 1, with spaced, forwardly tiltable pawls 111 located in a pit 112 with the upper run projecting above the floor level between the rails of a track 114 in position for the pawls to engage the axles 115 or other abutments of wheeled trucks 116 having detachable handles 109.

Loaded trucks 116 are backed onto the rails into abutting relation in order to make a continuous procession D of filter cakes stacked on their brims and tilted forwardly, and the trucks are intermittently advanced toward a cutting off position by a ratchet 117 mounted on sprocket shaft 118' of conveyor 110, and is intermittently advanced by a pawl rack 118 connected to an eccentric 119 rotated in unison with the auger shaft of the elevated pug mill 120 which rests on a platform 121 thereabove.

To elevate the clay above the level of the pug mill hopper 122 and discharge the material thereinto, I have provided a conveyor 123 composed of laterally spaced strands supported on a frame 135. Between the strands are supported scoop buckets 125 fastened to the chain at two points on each side so that they will not swing but will be caused to be tilted on their sides as they move across the upper level of the conveyor path between sprockets 124 and 126 to discharge their contents into the hopper. Said buckets are inverted as they move downwardly between sprockets 126 and 127 to a lower level where they travel tilted on their sides between sprockets 127 and 128 to scoop up clay from the platform of the trucks which may remain from previous cuttings, and as the buckets travel around sprockets 128 they are caused to engage and scoop clay from the lead end of procession D. If desired a cutting wire 129, Figure 2, may be suspended between arms 130 secured to opposite sides of each bucket to slice off clay ahead of each bucket from the procession D.

The movement of conveyor 123 is coordinated with the operation of the pug mill 120 and truck conveyor 110 by a pawl rack 131 connected to the eccentric 119 which intermittently rotates the ratchet 132 mounted on sprocket shaft 133. The effective stroke of racks 131 and 118 may be varied manually by adjustable members 136 operable to cause the racks to be lifted from engagement with the ratchets after a predetermined amount of rotation has been imparted thereto. It will be understood that the conveyors 110 and 123 may be continuously driven in coordinated fashion if desired by the substitution of a continuous drive.

If desired, vertical stacks of filter cakes 140, Figure 3, on trucks 141 may be pushed by hand or propelled by means of a chain 143 such as that shown at 110 in Figure 1, into the cutting plane defined by the scoops 142. These scoops are the same as those disclosed in Figure 1, and, the conveying structure is identical except for the omission of sprocket 128, which means the conveyor extends from sprocket 127 upwardly in an inclined plane to sprocket 124. The cutting surface of the scoops will cut across one or more stacks of cakes at an angle to thereby shave clay from a plurality of cakes disposed in such relation to the cutting plane that hard 137 and soft 138 and intermediate 139 portions of the cakes E, Figure 5, overlap relative to said cutting zone.

The operation of cutting slices 146 from vertical stacks of cakes on truck 147 by hand or with a power driven wire is illustrated in Figure 4, wherein 144 illustrates a holder for the wire 145, and X'X' the cutting plane.

I claim:

1. In combination with a pug mill, movable carrying means formed to support a procession of filter cakes laid one against the other, a movable container for receiving material from the leading end of said procession, cutting means arranged to move with and ahead of said container to cut material from said procession, and means for elevating said container and tilting the same to discharge the contents thereof into the pug mill.

2. Apparatus for feeding clay to a pug mill comprising, a support for carrying a column of filter cakes to a cutting off position, a series of cutters mounted in spaced relation and suspended above said support, an endless conveyor for carrying said cutters upwardly and across the axis of the column to segregate bodies of clay from several of the filter cakes, and a receptacle positioned and arranged with respect to each cutter so as to receive cuttings from the filter cakes and to carry the cuttings to the pug mill.

3. Apparatus for feeding clay to a pug mill comprising, a mobile truck for carrying a column of filter cakes to a cutting off position, means for guiding the truck into position and means for moving it relative to the position, a series of cutters mounted in spaced relation and suspended above said support, means for moving the cutters along a cutting line upwardly and across the axis of the column to segregate bodies of clay from several of the filter cakes each cutting operation, and a receptacle positioned and arranged with respect to each cutter for receiving cuttings and carrying them to the pug mill.

4. Apparatus for feeding clay to a pug mill comprising, a support for carrying a horizontal column of filter cakes to a cutting off position, a series of cutters supported by an endless chain arranged in a loop traveling through a cutting position and over the pug mill, said cutter being suspended above said support at the cutting off position and being movable along a cutting line upwardly and across the axis of the column to segregate bodies of clay from several of the filter cakes each cutting operation, and a receptacle associated with each cutter for receiving cuttings and carrying them to the pug mill.

5. Apparatus for feeding clay to a pug mill comprising, a support for carrying a column of filter cakes to a cutting off position, a series of cutters mounted in spaced relation and suspended above said support, means for moving said cutters in a straight line upwardly and across the axis of the column to segregate bodies of clay from several of the filter cakes each cutting operation, and a receptacle associated with each cutter for receiving the cuttings and carrying them to the pug mill.

6. Apparatus for feeding clay to a pug mill comprising, a support for carrying a column of filter cakes to a cutting off position, a series of cutters mounted in spaced relation and suspended above said support, means for moving said cutters upwardly and across the axis of the column to segregate bodies of clay from several of the filter cakes each cutting operation, and a receptacle formed integral with each cutter for receiving the cuttings and carrying them to the pug mill.

WILLIAM J. MILLER.

REFERENCES CITED

The following references are of record in the file of this patent:

UNITED STATES PATENTS

| Number | Name | Date |
|---|---|---|
| 233,764 | Innis | Oct. 26, 1880 |
| 268,976 | Anderson | Dec. 12, 1882 |
| 283,366 | Anderson | Aug. 21, 1883 |
| 320,865 | Frey | June 23, 1885 |
| 399,025 | Evans | Mar. 5, 1889 |
| 1,546,152 | Trynaski | July 14, 1925 |
| 2,185,459 | Hardgrove | Jan. 2, 1940 |

FOREIGN PATENTS

| Number | Country | Date |
|---|---|---|
| 498,570 | France | Jan. 15, 1920 |